Figure 6:
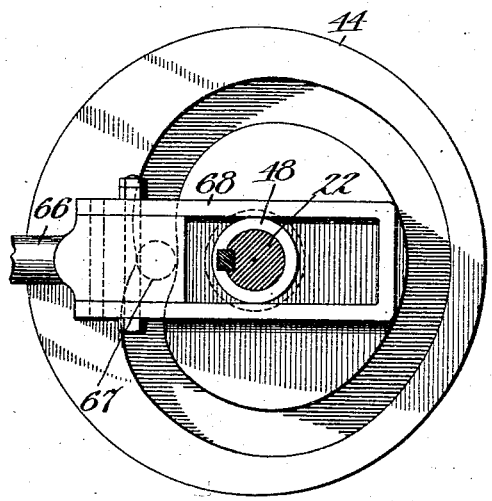
Figure 7:
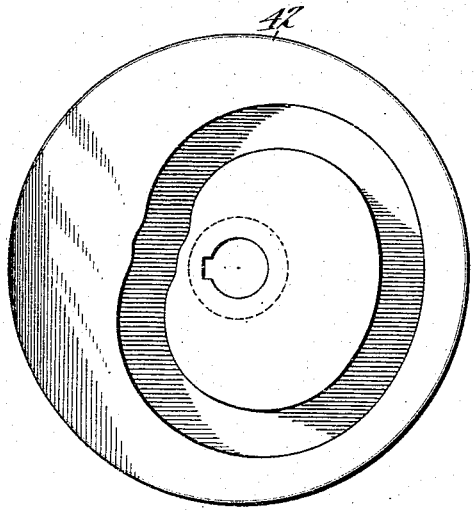
Figure 8:
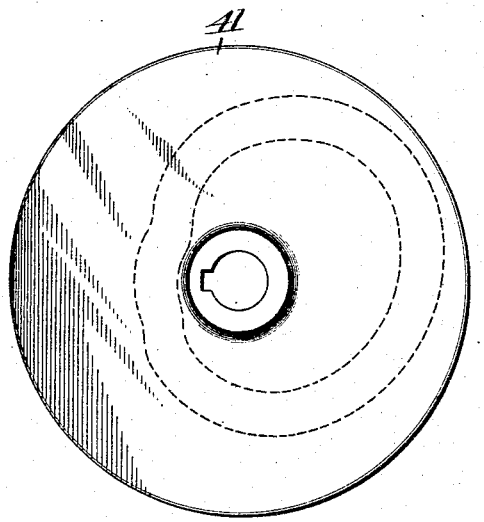

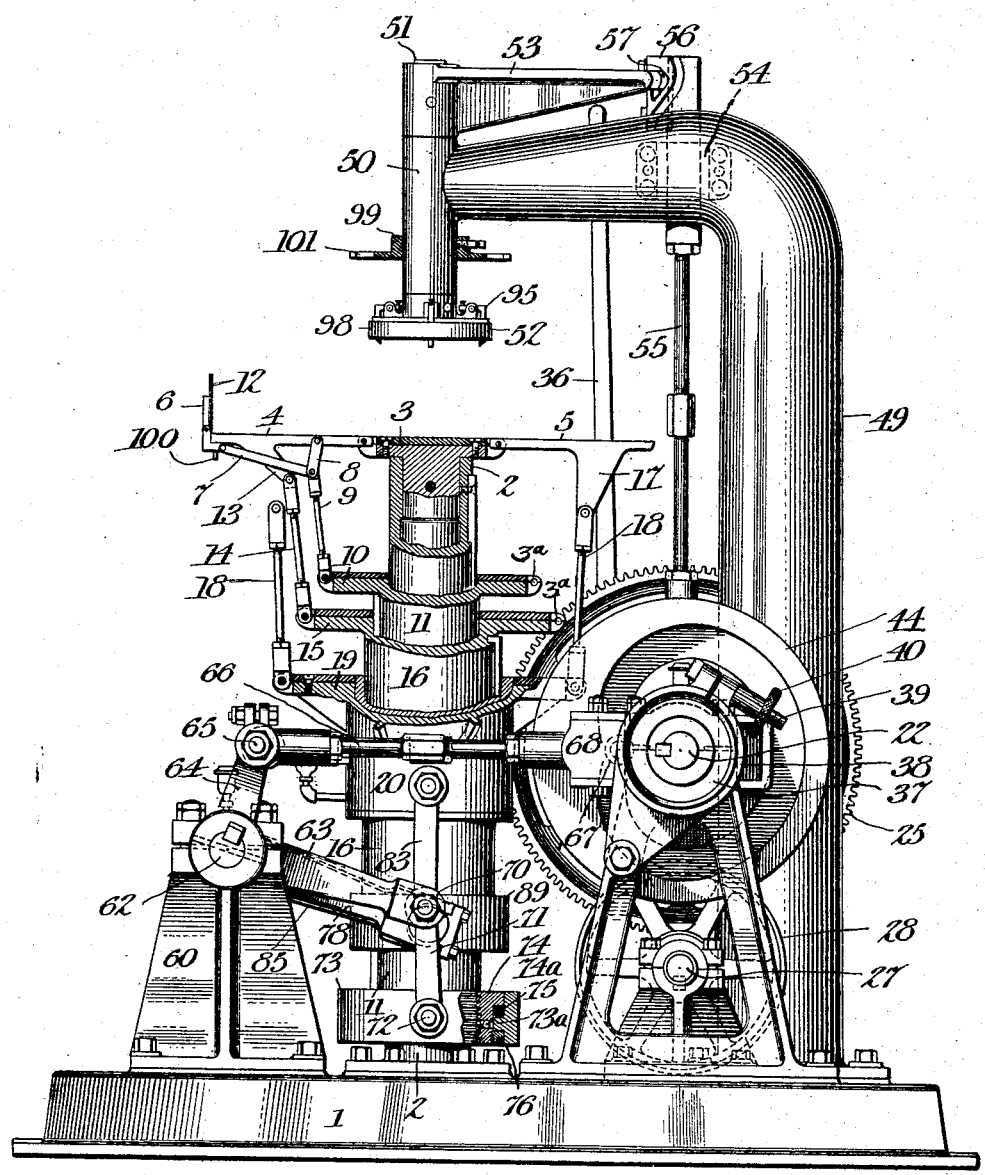

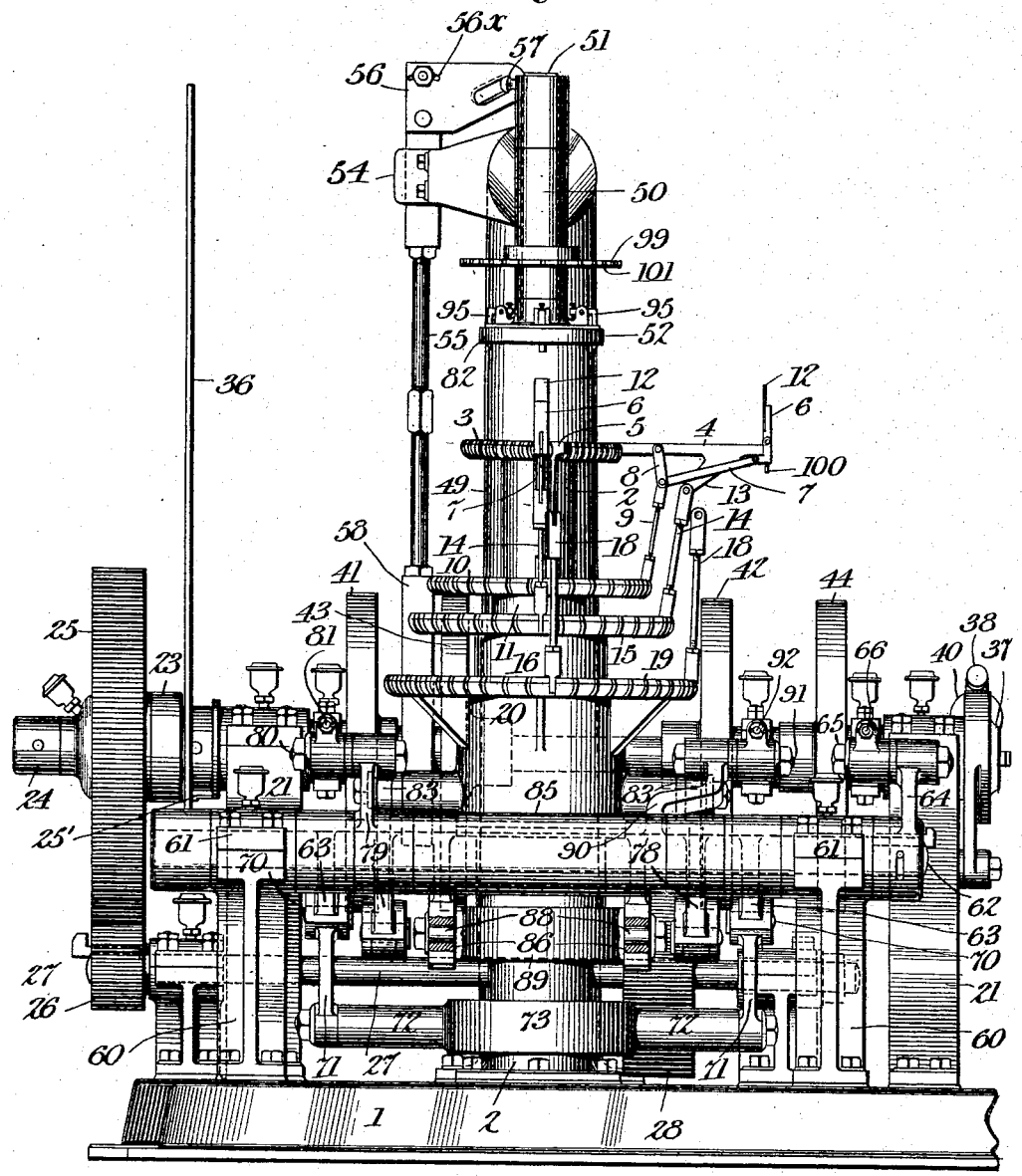

F. F. BRUCKER.
PLAITING MACHINE.
APPLICATION FILED JUNE 9, 1914.
1,186,374.
Patented June 6, 1916.
6 SHEETS—SHEET 3.
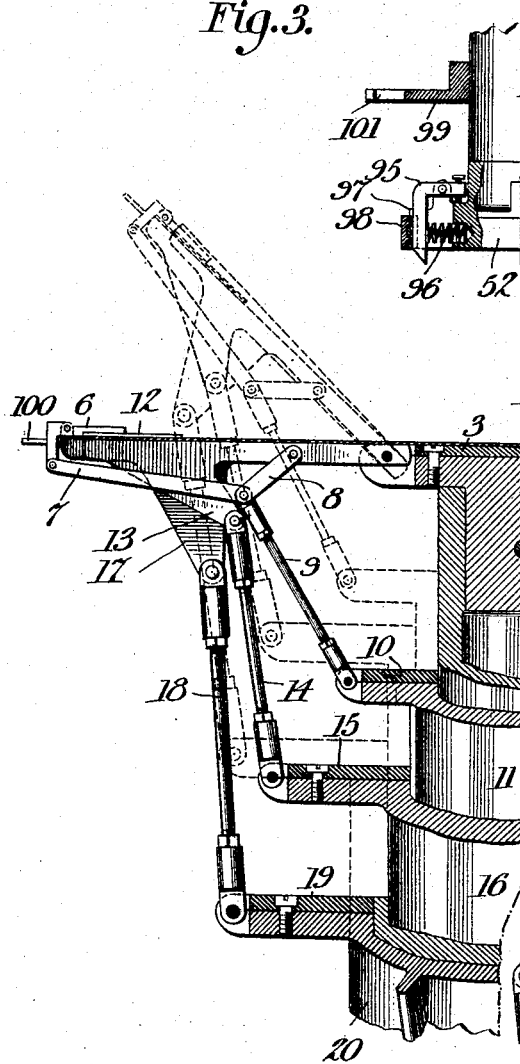
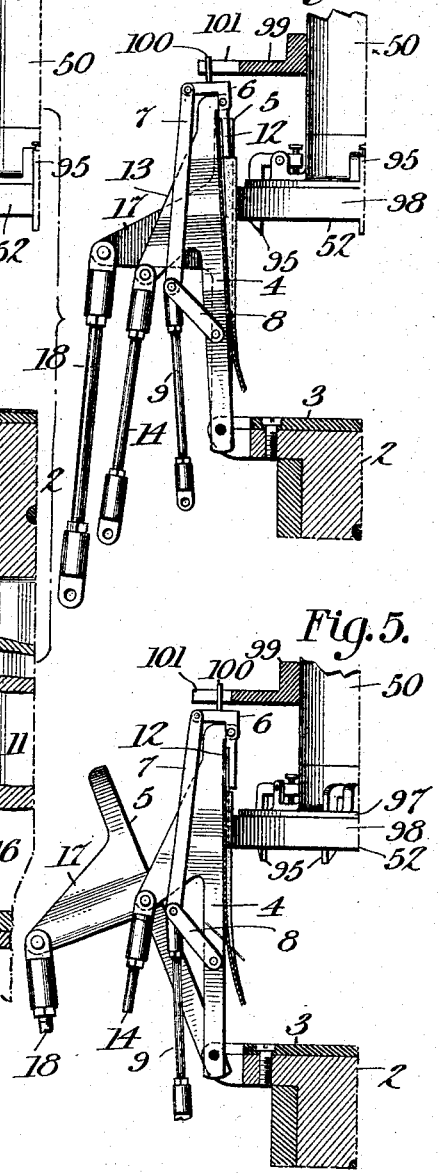
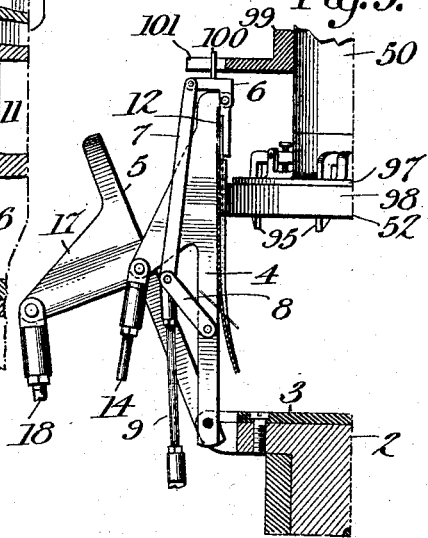
Witnesses
Philip E. Barnes
Edwd R. Tolson
Inventor
Ferdinand F. Brucker
By Charles E. Parsons
Attorney F. F. BRUCKER.
PLAITING MACHINE.
APPLICATION FILED JUNE 9, 1914.
1,186,374.
Patented June 6, 1916.
6 SHEETS—SHEET 5.
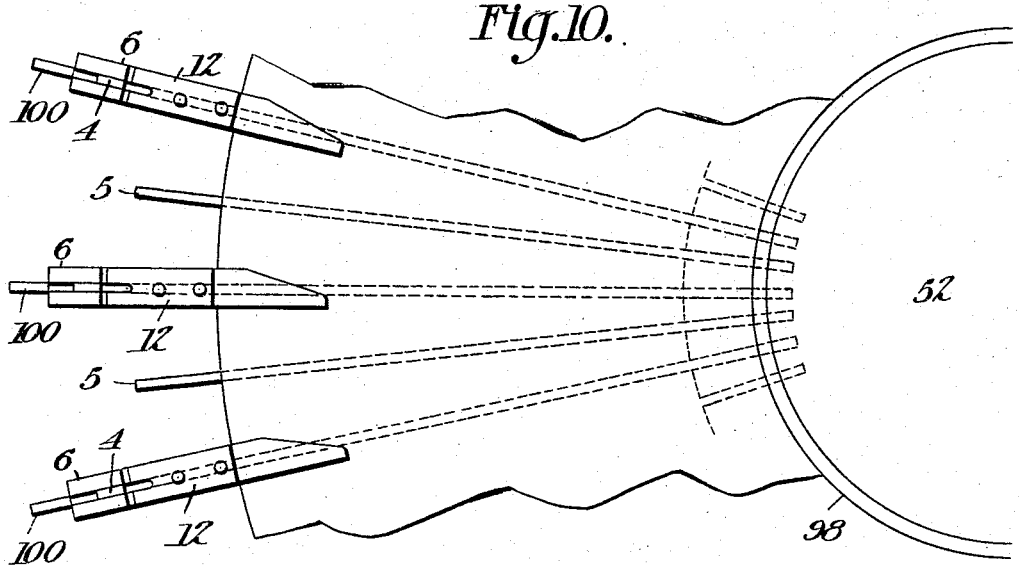
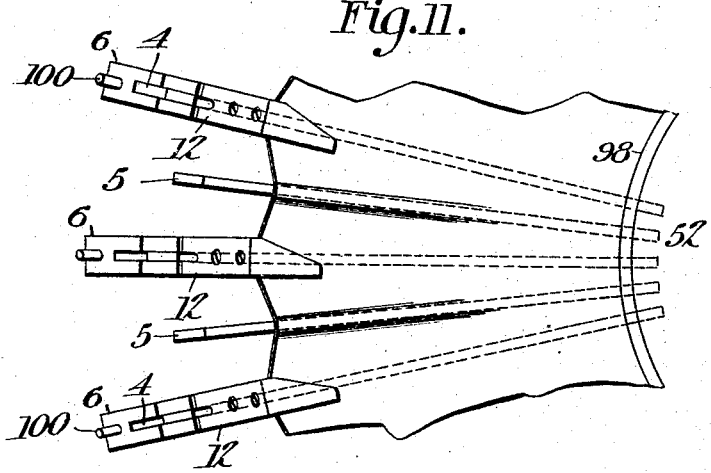
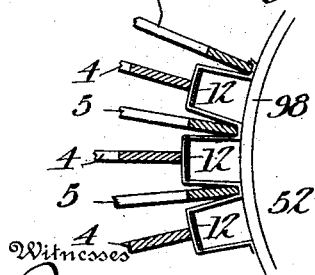 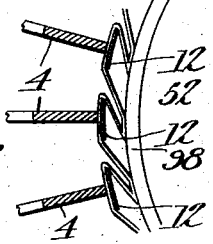 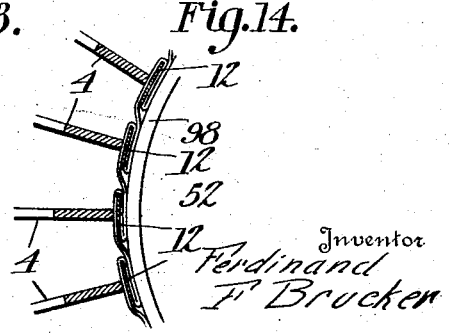

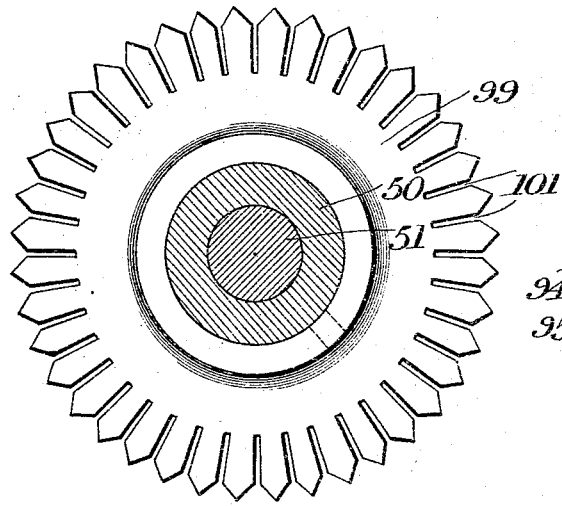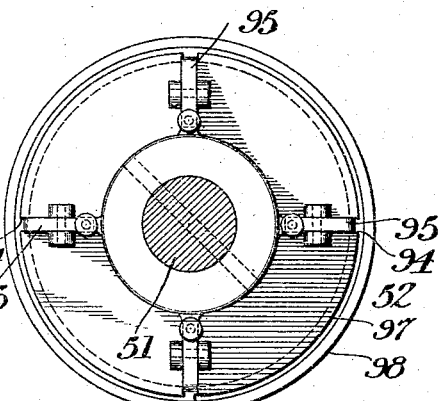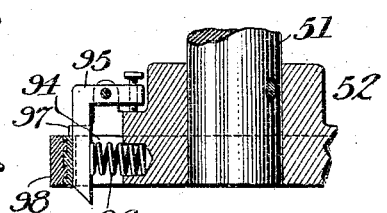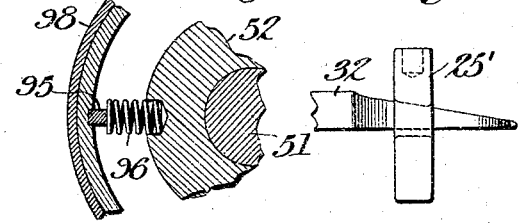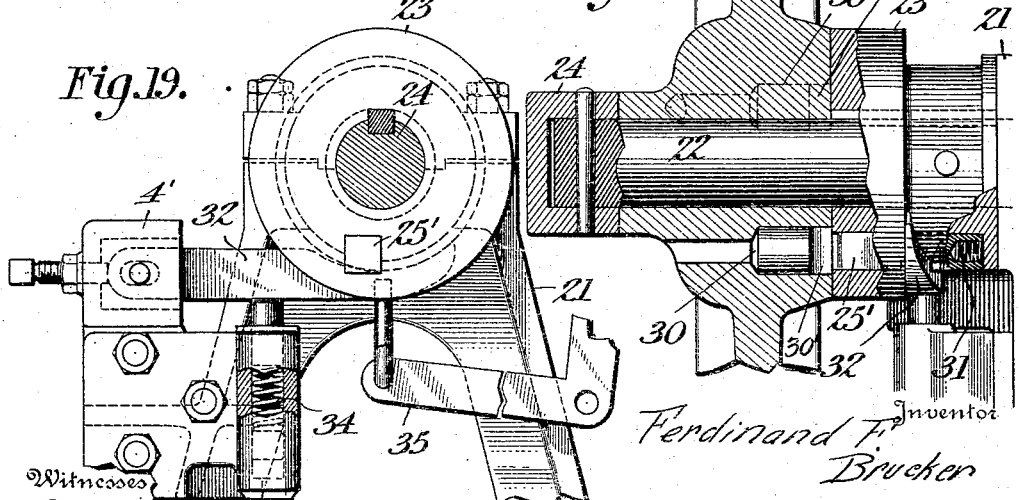

UNITED STATES PATENT OFFICE.

FERDINAND F. BRUCKER, OF AKRON, OHIO, ASSIGNOR TO MILLER RUBBER COMPANY, OF AKRON, OHIO, A CORPORATION OF OHIO.

PLAITING-MACHINE.

1,186,374. Specification of Letters Patent. Patented June 6, 1916.

Application filed June 9, 1914. Serial No. 844,095.

*To all whom it may concern:*

Be it known that I, FERDINAND FRANCIS BRUCKER, a citizen of the United States, residing at Akron, in the county of Summit and State of Ohio, have invented certain new and useful Improvements in Plaiting-Machines, of which the following is a specification.

The present invention relates to an improved process and apparatus for plaiting sheet materials, such as rubber, paper, cloth, or other fabric.

The invention was designed primarily for the purpose of plaiting a circular disk of rubber to form a bathing cap, but is not restricted to this particular use, as the principle embodied herein can readily be employed in the production of various other articles of the same and other materials.

The invention consists essentially in providing an improved method and means for plaiting a circular piece of rubber or similar fabric, by first preparing the material to be used, folding it, or a portion of it into plaits, and permanently cementing the plaited portion to retain the desired form.

Although the invention, as hereinafter set forth, is described and illustrated primarily for the production of a circular article such as a bathing cap, it is nevertheless equally well adapted for plaiting material in the form of a half disk, a quarter disk, a flat ring of stock, having the center cut away, or any portion of a flat ring of stock.

With these and other objects in view, the invention consists in the novel features and combination and arrangement of parts hereinafter described, illustrated in the accompanying drawings, and pointed out in the appended claims.

In the drawings: Figure 1 is a side elevation with parts in section. Fig. 2 is a front elevation of the complete machine. Figs. 3, 4 and 5 are enlarged detailed sections with parts shown in elevation illustrating the successive positions of the clamping and folding arms and the circular former head during the various stages in the operation. Figs. 6, 7, 8 and 9 are elevational views of the operating cams. Figs. 10 to 14 are diagrams showing the relative positions of the clamping and folding arms which carry the stock and the circular former head, Fig. 10 being a diagram with the radial arms in their initial position and the material lying flat thereon. Fig. 11 shows the position of the two sets of arms as they are being advanced toward the circular former head. Fig. 12 shows one set of arms carrying the material in contact with the former head in advance of the other set. Fig. 13 shows the next stage of the operation, the first set of arms having receded with the second set advancing toward the former head and the latter turning circumferentially. Fig. 14 shows the final plaiting operation with the clamping fingers in the folds prior to withdrawal. Fig. 15 is a plan detail of the top guide plate above the former head, with parts in section. Fig. 16 is a top plan of the former head. Fig. 17 is a sectional detail through one of the dogs holding the cementing ring onto the head. Fig. 18 is a view partly in section showing one of the dogs in elevation. Fig. 19 is an enlarged detail view of the clutch releasing mechanism. Fig. 20 is a sectional detail of same. Fig. 21 is a fragmental detail of the releasing dog, and Fig. 22 is a sectional detail of the shaft 62 and quill shafts carried thereon with their respective arms shown in elevation.

Referring now to the drawings, the machine is supported on a base plate 1. A stationary, vertical column or post 2 is centrally mounted on the base plate 1, and is permanently fastened thereto by bolts passing through a flanged plate formed at its lower end. Column 2 supports at its upper extremity a circular plate 3 having twice as many radial slots cut in its circumference as the number of plaits which it is desired to produce in the finished article. The plate 3 comprises two radially slotted disks held together by screws, and having annular recesses of semicircular cross section cut in the faces of their contracting surfaces, so as to form, when assembled, a circular cavity located below the upper surface of the plate and extending completely around its outer slotted circumference. The plate 3 constitutes a central bearing plate for a plurality of pivoted plaiting and folding blades which extend radially therefrom. These blades are of two distinctly different types 4 and 5 respectively, and are arranged alternately in the slots around the circumference of the plate 3, being pivotally carried on small, round trunnions or pins disposed within the circular cavity 3ᵃ and passing through perforations formed in the inner ends of the blades. When the machine is in its normal position of rest the folding blades all lie in the same horizontal plane and form together with the plate 3 a level table upon which the stock to be plaited is laid.

From the foregoing it will be understood that there are an equal number of the blades 4 and 5, and that the number corresponds exactly with the number of plaits to be formed. The blades 4 are provided with hinged clamp fingers 6 hinged to their outer ends to swing about their axes through an angle of 90°. For convenience the blades 4 will hereafter be referred to as clamping blades to more readily distinguish them from the folding blades 5. Two similar links 7 connect each clamp finger 6 to one end of a pair of links 8, the other ends of which are pivoted to the blades 4, as shown. Adjustable connecting rods 9 are connected at their upper ends to the pivots connecting links 7 and 8, and at their lower ends to the flanged collar plate 10 of a sliding sleeve 11, which encircles column 2; the bearings in plate 10 being of similar construction to those on plate 3. The clamping fingers 6 are provided with measuring fingers 12 riveted thereto and extending beyond their free ends in a straight line. Motion in an upward direction of sleeve 11 simultaneously folds all the clamping fingers 6 down upon the blades 4, thus clamping the material which lies thereon.

The clamping blades 4 are formed near their outer ends with depending ear pieces 13 which are pivotally connected to one end of adjustable rods 14, the other ends of which have swivel connection with a flange collar plate 15 of a second sleeve 16, which surrounds sleeve 11 and is free to slide vertically thereon. Motion imparted to sleeve 16 moves all the clamping blades 4 simultaneously.

The folding blades 5 are formed with depending ear pieces 17 (similar to the pieces 13) which are pivotally connected to the upper ends of adjustable rods 18, the lower ends of which have a swivel connection with a flange collar plate 19 of a third sleeve 20 surrounding sleeve 16 and free to slide vertically thereon. Motion imparted to sleeve 20 moves all the folding blades 5 simultaneously.

Fastened at the opposite sides of the base plate 1 and supported by it are two pedestals 21. These pedestals are arranged in the rear of the stationary column 2, and are in line with each other. They are provided at their upper ends with bearings in which the main operating shaft 22 is journaled. Keyed near one end of shaft 22 is a collar 23, and a cap 24 is fastened on the same end of this shaft. A gear wheel 25 is loosely journaled on shaft 22 and is confined between cap 24 and collar 23. Gear wheel 25 is driven by a small gear 26 with which it is constantly in mesh. This gear is positively carried on a driving shaft 27 suitably journaled in bearings mounted on the base plate 1. At its opposite end the shaft 27 is provided with a driving pulley 28 coupled by a belt to the source of power (not shown).

Figure 9:
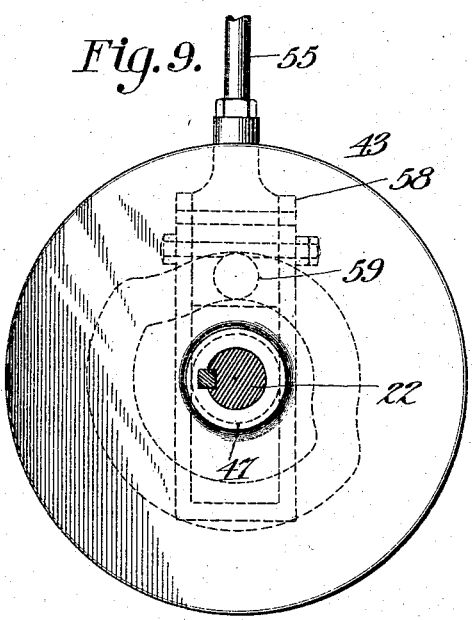

A sliding clutch pin 25' is carried in a recess in the collar 23, but being longer than the thickness of the collar is adapted to protrude therefrom on one side or the other. Gear wheel 25 is provided with circular notches formed in its face adjacent the collar 23. Circular plugs 30 are inserted in these notches and are formed with slots 30' at their outer ends, which the clutch pin 25' enters to lock the wheel 25 to shaft 22. A coiled spring 31 is compressed within pin 25 within the collar 23, and tends to push the end of the pin into gear wheel 25 when the pin is released. The opposite end of clutch pin 25' which projects from the inner face of collar 23 is formed with a cut out notch or recess adapted to be engaged by the end of a releasing dog 32 pivotally carried on a bracket 4' on the pedestal 21. The free end of the releasing dog 32 is tapered and curved so as to conform to the surface of collar 21 which it surrounds, and engages the notch of the clutch pin 25' in such manner that when it is moved about its pivot the wedge-shaped edge will draw the clutch pin 25' into the collar 23, releasing the gear wheel 25. A coiled spring 34 housed within a casing in the bracket 4' bears against the dog 32, keeping it in contact with the collar 23. Releasing dog 32 is provided with an eye bolt on its lower side to which an arm of a bell crank lever 35 is secured, the other arm of which terminates in the handle 36 extending upwardly to some position where it will be readily accessible to the operator. The above arrangement is such that in operation the dog 32 is depressed by means of the handle 36, which releases clutch pin 25', which in turn engages gear wheel 25, coupling shaft 22 with the source of power through gear pinion 26. When shaft 22 has made one revolution, dog 32 again enters the notch in the end of clutch pin 25' withdrawing it from engagement with gear wheel 25 and consequently uncoupling shaft 22 therefrom. Thus one revolution of shaft 22 is accomplished before the machine again stops. The opposite end of shaft 22 carries a disk 37 which is surrounded by a brake band 38 whose object is to prevent the shaft 22 from coasting. Brake band 38 is adjusted by a bolt 39 and hand wheel 40 screw threaded thereon. Shaft 22 also carries four cams 41, 42, 43 and 44 disposed at suitable points along its length, which may be keyed thereto or adjustably fastened so that they may be shifted around the shaft, and fastened in any position for the purpose of adjusting their period of operating. Four bushings 45, 46, two of which are shown at 47 and 48 on Figs. 6 and 9 are freely carried on the shaft 22 and serve to support the ends of push rods, as will hereinafter be explained.

A bent column 49 is supported by base plate 1 having its base secured thereto in the rear of column 2, and being provided at its upper end with a vertical sleeve 50 which forms a bearing for a shaft 51 having the same axis as the column 2. The shaft 51 carries at its lower end a circular head 52 (which will be more fully described hereafter), and at its upper end an arm 53. A tubular bearing 54 confines the upper end of a vertically movable adjustable push rod 55 on the extreme upper end of which a cam plate 56 is secured. The cam plate 56 is provided with an inclined slot in which a roller 57 on the end of arm 53 is confined, thus converting vertical motion of the push rod 55 into circular or oscillatory motion of arm 53, shaft 50 and head 52. The vertical push rod 55 carries at its lower end a strap 58 which slides over bushing 47 on the shaft 22, thus constraining the motion of rod 55 to an approximately straight line. A roller 59 is carried on the lower end of shaft 55 and is confined in a groove in cam 43. It will thus be seen that motion of vertical rod 55 and hence indirectly motion of the head 52 is controlled by the shape of cam 43. A further and more direct means of adjusting the motion of head 52 is provided for in the manner of attaching the cam plate 56 to the upper end of rod 55. The pitch or departing angle of the slot in plate 56 is changed by means of this adjustment. Plate cam 56 is secured to the rod end by two tap bolts, one of which acts as a stud around which the plate cam 56 may turn; the other passes through a curved slotted hole 56× in cam plate 56 and locks the plate to the rod end at various angles. The same result may be obtained by having different interchangeable cam plates laid out at different angles. The angular motion of head 52 is thus increased or decreased for the purpose of varying the design of the plaits.

Two pedestals 60 are secured to the base plate 1 at opposite sides thereof, in front of column 2. They are provided at their upper ends with bearings 61 in which a horizontal shaft 62 is loosely journaled. A pair of radially extending arms 63 are keyed to shaft 62. These arms are sufficiently spaced apart on the length of the shaft, and are so positioned as to extend in a downward direction on either side of the central vertical column 2. A third arm 64 is keyed to shaft 62 and extends radially therefrom at right angles to the arms 63, forming a rigid bell-crank structure. A stud 65 is carried in the free end of arm 64 to which an adjustable horizontal push rod 66 is pivoted. The other end of the push rod 66 carries a roller 67 and a strap 68 sliding over bushing 48 on shaft 22, similar in construction to the vertical push rod 55 hereinbefore described. The roller 67 of this push rod is confined in a groove in cam 44, and motion of arms 63 is controlled by the shape of cam 44. The extreme ends of the arms 63 are provided with studs 70 to which are pivotally fastened the upper ends of a pair of connecting links 71, the lower ends of which are pivotally fastened to trunnion arms 72 extending from the opposite sides of a collar 73 surrounding an inner collar 74 on the lower end of sleeve 11. This inner collar 74 has an outwardly projecting shoulder 74$^a$. The outer collar 73 has an inwardly projecting shoulder 73$^a$ extending beneath and spaced apart from shoulder 74$^a$ to form an inclosed annular cavity between the two in which a ring 75 of elastic material is placed, and acts as a spring connection between collars 73 and 74. A ring 76 is screw-threaded on the lower end of collar 74 and serves to retain collar 73 on collar 74. Through the above described mechanism sleeve 11 is controlled by cam 44, hence the clamping fingers 6 are controlled by cam 44, and their motion is defined by the shape of said cam 44 and the adjustment of rods 66 and 9, which latter have their ends screw-threaded into the sockets by which they are hinged to the adjoining parts, although the movement of blades 4 must also be taken into account, as the two movements are not independent of each other, as will be hereinafter described.

Surrounding a portion of shaft 62 is a quill shaft 77 freely carried thereon. Quill shaft 77 carries a lifting arm 78 formed integral therewith at one end, and keyed to its opposite end is a bell crank 79 having one of its arms of the same length as the fixed arm on the quill shaft and extending radially in the same direction, thus forming a pair of arms similar to arms 63 on shaft 62. The other arm of bell crank 79 extends radially at right angles to the fixed arm 78 and carries at its extremity a stud 80 to which is pivotally connected an adjustable horizontal push rod 81, the other end of which is provided with a roller and a strap sliding over a bushing on shaft 22. The roller is confined in a groove in cam 41 on shaft 22. These parts are constructed and operate exactly as the analogous parts described in connection with cam 44. The pair of equal arms extending from quill shaft 77 is pivoted to the lower ends of a pair of vertical connecting links 83 whose upper ends are pivoted on opposite studs on sleeve 20. Through the above described mechanism sleeve 20 and therefore folding blades 5 are controlled by cam 41.

A second quill shaft 85 surrounds quill shaft 77, being freely mounted thereon. Quill shaft 85 has a pair of radial arms 86 disposed in the same plane and of equal length, and having radially slotted ends, in which are slidably mounted bearings which surround oppositely disposed trunnions 88 on a collar 89 rigidly secured to the lower end of sleeve 16. A third arm 90 extending radially therefrom at right angles to the arms 86 is rigidly secured to the quill shaft, forming with arms 86 a bell crank. A stud 91 carried in the end of arm 90 has pivotal connection with a horizontally disposed push rod 92. This push rod is provided at its opposite end with a strap sliding over a bushing on shaft 22 and has a roller confined in a groove in cam 42. Through the above described mechanism, sleeve 16 and therefore blades 4 are controlled by cam 42. As clamping fingers 6 are pivoted to blades 4 and must be carried thereon through every position, which blades 4 may occupy during the cycle of the machine, it follows that clamping fingers 6 are controlled by the combined motions of cam 42 and cam 44, and also that the blades 4 are controlled by the combined motion of cams 42 and 44. Furthermore, the various adjustments of the different connecting rods described above can be used to alter the initial position of blades 4 and 5, and clamping fingers 6 and hence every other position of these parts in order to obtain different results with the material operated upon, and overcome inaccuracies in building the machine.

Having described the mechanism through which the various motions from the cams on shaft 22 are transmitted and converted to the several parts which operate directly on the material, the construction and operation of the latter will be described hereinafter in detail.

The head 52 is provided with one or more radial slots 94 in which are pivotally mounted keys 95 which are normally pressed outwardly by coil springs 96 contained in recesses in the head 52. One or more rings 98 are made to slip over the head 52, and contact with an outward annular flange 97 provided at its upper edge. The rings are provided with one or more keyways which are engaged by keys 95, thus serving to lock the ring 98 to the head 52 in such manner as to prevent circular motion of the ring about the head 52, and further so gripping the ring as to prevent it from dropping by reason of its weight. Interchangeable rings 98 may be provided of various construction and material other than described above to suit different materials operated upon, the only requirement which must exist being that their largest diameter must be made to equal the size to which the material is to be plaited. Because of the difficulty in making and adjusting like parts of the machine so as to get perfect contact of all the blades 4 and 5 against the ring, it is preferable in actual practice to make the outer parts of these rings of an elastic material as, for example, india rubber, which will conform to the various variations of said blades and cause contact with all of them.

As previously described, the head 52 receives an annular motion from the cam 43 through the vertical push rod 55, and an inclined slot in the cam plate 56. Cam 43 is laid out so as to raise rod 55 through a certain fixed interval a certain fixed distance, then dwells through a certain fixed interval, then lowers rod 55 through a fixed interval, then dwells through the next interval; therefore plate cam 56 is raised and lowered always through the same distance as laid out on cam 43, and all adjusting of the angle, through which head 52 turns, must be done by means of changing the pitch or departing angle of the inclined slot in cam plate 56, as has previously been described.

A circular plate 99 is rigidly secured to the vertical bearing on the column 49 at some suitable point above the lower head 52, and is provided with radial slots 101 equal in number to the clamping fingers 6 and having enlarged apertures at their outer extremities. Clamping fingers 6 are provided with projecting pins 100 which stand in a vertical position when blades 4 are moved about their pivots to a vertical position. These pins in the clamping fingers enter into the radial slots 101 in plate 99, before the blades 4 make contact with the ring 98, and remain in said slots, guiding the extremities of blades 4 in order to equal the space in the said blades and prevent blades 4 from being deflected by the turning of head 52. Plate 99 also guides blades 5 to form equal spaces between the folds. As blades 5 are between blades 4 at all times when both sets of blades are rising, and as blades 5 are so closely confined between blades 4 when the aforedescribed pins are entering said slots in plate 99 that when blades 4 are equally spaced blades 5 will also be equally spaced before they make contact with the ring 98.

The operation of the machine may be described as follows: The circular disk which, on this design of machine, may vary in diameter from the smallest size which the clamping fingers can hold, to the largest size which will lie flat on the blades 4 and 5 inside of the clamping fingers 6, which stand vertically as shown in the drawings, is first prepared for plaiting. This preparation varies with the material used; that is, as the permanent placing and holding of the plaits depends upon cohesion or adhesion, the material must be prepared so as to adhere or cohere at the place desired, and not to adhere or cohere at the place where the plaits are desired to hang or stand in folds. With unvulcanized rubber or like compositions it is necessary to render the surface sticky by the application of a solvent at the points which it is desired to have cohere, and dusting all other portions with soapstone or some similar composition. With vulcanized rubber or like compositions it is necessary to paint the portions which it is desired to have adhere with a cement which will cause adhesion. With fabric covered with rubber or similar materials the above process may be used. With cloth, leather or paper or similar compositions the parts which it is desired to have adhere are painted with a glue or cement suited to the material. In using some cements the action of heat would be of great assistance if not absolutely necessary in some cases, and in using cements of this nature or plastic materials which are softened and become sticky themselves at moderately warm temperatures it is proposed to apply heat to the head 52 or to the ring 98 or both, which heating may be done in place on the machine or the ring 98 previously heated before placing in the machine.

In using one of the methods above described, suited to the material at hand, the disk of material is prepared to adhere at all points coming adjacent the ring 98 in the folding process which, for instance, would be an annular band around both sides of the disk of a width corresponding to the depth of ring 98 and at such a distance from the edge of the disk or material as to register with said ring. This disk of material is then placed centrally on blades 4 and 5 which, in their normal position, present an approximately flat surface. The ring 98 is then placed on head 52. The handle 36 operating the clutch on shaft 22 is then moved, causing gear 25 to engage with shaft 22, which will then make one complete revolution and disengage itself from gear 25. When shaft 22 starts to revolve the rollers in the cams are all at the nearest points to the center of shaft 22, and the roller on cam 44 immediately starts to travel away from the center of shaft 82 until the clamping fingers 6 have folded down against the blades 4, thereby clamping the disk of material so that it will have to follow blades 4. Previous to this blades 4 and 5 have not moved from their original position due to the fact that cams 41 and 42 have a dwell during this interval. Blades 4 and 5 now start to move upward and inward toward ring 98, both sets of blades starting to move at the same time, but blades 5 travel faster than blades 4. During this interval finger clamp 6 remains in the same relative position to blades 4, and as the material is held down to blades 4 by clamps 6 and blades 5 are constantly getting ahead of blades 4 the material takes the shape of corrugations or folds. This distance which blades 5 are in advance of blades 4 at any moment is just enough to take up the slack caused by the blades 4 coming closer together, and cams 41 and 42 are designed to take care of this while cam 44 is so designed as to make clamp 6 and blades 4 keep the same relative position to each other. Furthermore, any inaccuracies in cutting the cams are overcome by the spring connection between collars 74 and 73 as previously explained. This last motion is continued until blades 5 which are in advance of blades 4 come in contact with ring 98, when both blades 4 and 5 stop moving. Ring 98 has been previously prepared so that the material between blades 5 and ring 98 will adhere to the ring when the blades are withdrawn. During the next operation blades 4 remain in their last position, while blades 5 recede toward their original position, cams 42 and 44 being designed with a dwell during this interval, and cam 41 being designed so that its roller travels back toward the center of the shaft 22. When blades 5 have receded far enough to be out of the way of further travel of blades 4 upward, blades 4 again start toward ring 98, and at the same time cam 43 rotates head 52 and ring 98 through a small angle, ring 98 attaining its stopping point at the same moment that blades 4 bring clamping finger 6 in contact with ring 98, and also stop. Blades 4 then remain in contact with ring 98 until the material which is now plaited around ring 98 perfectly adheres to itself. Blades 4 then recede from ring 98 and at the same time clamp fingers 6 gradually release the material so that measuring blades 12 attached to clamps 6 and which are each surrounded by a plait of the material are withdrawn. Blades 4 continue receding until they reach their original position by which time blades 5 and clamping fingers 6 have also reached their original position. Head 52 carrying ring 98 and the plaited material also turns back to its original position as soon as both sets of blades are out of the way and the machine then stops. The plaited article may then be removed on the ring 98 and afterward removed therefrom.

In making various articles such as can be accomplished on this machine, it is found that many are improved in appearance and strengthened by the addition of a band of the same material applied over the portion where the plaits are cemented together, and this may be done in two different ways: first, a band of material is placed around the ring 98 and prepared so as to present an adhesive surface, the same as though it were the ring 98 itself. The disk is then plaited against this band of material as above described, and after plaiting the material plaited with the band adhering thereto may be slipped off of the ring 98 and a second band may then be prepared and put over the outside if so desired. The second method is as follows: Ring 98 is first covered with a band of starched fabric or otherwise prepared so as to present a surface to which the cement used will adhere only slightly. Over this a coat of cement is placed, and the disk of material plaited to this cement surface. The ring 98 is then taken from the machine and a band of material placed around the outside of the plaited surface. The plaited article may then be stripped from the starched or otherwise prepared surface or ring 98 and turned inside out, and the second band laid on over the plaits if required. This has proven the most successful method in making articles of india rubber. The starched coating decreases the adhesiveness of the material to the fabric and facilitates stripping off the plaited article.

Some articles do not require to be plaited all around, and in such case the disk is only prepared with cement or otherwise as described above for the distance around the disk which is to be plaited. The machine is then operated as described above, and the plaits where the stock is prepared are stuck while the portions not prepared fall apart after being plaited. The machine will also plait a half disk, a quarter disk, a flat ring of stock having the center cut away, or any portion of a flat ring of stock.

In order to overcome any difficulty which otherwise would be experienced in getting the measuring fingers 12 to withdraw out of the sticky material in which they are completely inclosed in the plaiting operation, it is advisable either to dust them with some powdered material such as soapstone, which will prevent the adhesion of the material to the fingers, or to wipe them with a cloth or brush dipped in a lubricant. For example in using a rubber cement a tri-acid alcohol such as glycerin has been found to be good lubricant.

I claim as my invention:—

1. A machine of the class described comprising a former, and means for simultaneously presenting a plurality of spaced portions to said ring former at a plurality of points around its circumference to form a plurality of radial plaits or folds in the material.

2. A machine of the class described comprising a former, and means for simultaneously presenting a plurality of spaced portions to said ring former at a plurality of points around its circumference to form a plurality of radial plaits or folds in the material, and means for imparting circumferential movement to said former.

3. A machine of the class described comprising a former, means for simultaneously presenting a plurality of spaced portions of a sheet of material to said former at a plurality of points around its circumference, and means acting successively to said first acting means for simultaneously presenting a plurality of other portions of said sheet to said former.

4. A machine of the class described comprising a former, means for simultaneously presenting a plurality of spaced portions of a sheet of material to said former at a plurality of points around its circumference, and means acting successively to said first acting means for simultaneously presenting a plurality of other portions of said sheet to said former, and means for imparting circumferential movement to said former.

5. A machine of the class described comprising a former head, a plurality of sets of devices adapted to carry a sheet of material, means for advancing one set of said devices toward said former head to cause spaced portions of the material to contact therewith, and means for imparting a retarded movement to another set of devices to cause other portions of the material to be subsequently pressed against the former head.

6. A machine of the class described comprising a former, two sets of pivoted plaiting arms adapted normally to lie in a horizontal position to support a sheet of flexible material, devices carried by one set of arms for clamping the edges of the sheet, means for causing the other set of arms to press spaced portions of the sheet against the former while other portions are held by said devices, and means for subsequently causing the arms carrying said devices to press said other portions of the sheet against the former.

7. A machine of the class described comprising a circular former head, a plurality of sets of devices adapted to carry a circular disk of material, means for advancing one set of said devices toward said former head to make the material contact therewith, and for causing them to recede therefrom, means for causing a second set of said devices to move toward said former head slightly in rear of said first set and for causing them to halt in their inward movement while said first set contacts with the former head, then continue inward to contact with the former head and recede therefrom, and means for moving said former head circumferentially while said sets of carrying devices are held against said circumferential movement, substantially as described.

8. A machine of the class described comprising a circular former head, a stationary column positioned in axial alinement with said former head, a plurality of sets of radial arms pivotally carried on said column adapted normally to carry a flat circular piece of material, means for moving said arms about their pivots to present successive portions of said material to the former head and form radial plaits or folds therein, and means for moving said former head circumferentially, substantially as described.

9. A machine of the class described comprising a circular former head, a stationary column positioned in axial alinement with said former, a plurality of sets of radial arms pivotally carried by said column, said sets of radial arms adapted to present successive portions of a circular piece of material carried thereon to said former to form radial plaits or folds in the material, a common element for each set controlling the movement of all radial arms in its respective set and means for moving the common elements independently of one another, substantially as described.

10. A machine of the class described comprising a circular former head, a stationary column positioned in axial alinement with said former head, a plurality of sets of radial arms pivotally carried on said column adapted to carry a circular piece of material, a plurality of sliding sleeves movable on said column, connections between each sleeve and the radial arms of the respective set controlled thereby, and means for moving said sleeves, substantially as described.

11. A machine of the class described comprising a circular former head, a stationary column positioned in axial alinement with said former head, a set of radial clamping arms pivotally carried on said column adapted to carry a circular piece of material, a set of radial folding arms, similarly carried on said column and alternately arranged in respect to said clamping arms, hinged clamping fingers carried on said clamping arms, three separate elements sliding on said column having connections with and adapted to control the movements of the clamping arms, the folding arms and the clamping fingers respectively, and means for moving said sliding members independently, substantially as described.

12. A machine of the class described comprising a circular former head, a stationary column positioned in axial alinement with said former head, a set of radial clamping arms adapted to carry a circular piece of material, hinged clamping fingers carried on said arms, a set of radial folding arms similarly carried on said column and alternately arranged in respect to said clamping arms, a sliding sleeve movable on said column and having connections to the clamping fingers for moving them simultaneously, a second sleeve slidable on said first sleeve and having connections with the clamping arms, a third sleeve slidable on the second sleeve and having connections with the folding arms, and means for moving said sleeves independently of one another, substantially as described.

13. A machine of the class described comprising a circular former head, a stationary column positioned in axial alinement with said head, a set of radial clamping arms adapted to carry a circular piece of material pivotally carried on said column, hinged clamping fingers on said arms, a set of radial folding arms, similarly carried on said column and alternately arranged in respect to said clamping arms, three movable sleeves arranged to slide one within the other on said column and having connections with the sets of clamping fingers, clamping arms and folding arms respectively, a horizontal shaft at one side of said column, a second horizontal shaft arranged on the other side of said column having a pair of axial sleeves carried thereon, grooved cams carried on said first mentioned horizontal shaft, bell cranks carried on said second horizontal shaft and said axial sleeves, horizontal push rods each having one end connected with one arm of the bell cranks and having their opposite ends coöperate with said cams, and connections between the other end of each bell crank and the respective sliding sleeves, substantially as described.

14. A machine of the class described comprising a stationary column, a plurality of radial arms pivotally carried at the upper end thereof adapted to carry a circular piece of material, a vertical bent column positioned in rear of said first column and carrying at its upper end a movable sleeve, a circular former head attached to the lower end of said sleeve spaced from and in axial alinement with said stationary column, a horizontally disposed shaft at one side of said column, a cam keyed on said shaft, a vertical push rod having a bearing in the upper part of said bent column and having its lower end coöperate with said cam, said push rod provided at its upper end with a plate having an inclined slot formed therein and an arm rigidly connected with said movable sleeve and having its inner end engaging in said slot whereby the rotation of the horizontal shaft causes the vertical push rod to move in its bearing and converts such movement into a circumferential movement of the former head.

In testimony whereof I affix my signature in presence of two witnesses.

FERDINAND F. BRUCKER.

Witnesses:
R. GRIFFITH,
C. A. WOLF.

Copies of this patent may be obtained for five cents each, by addressing the "Commissioner of Patents. Washington, D. C."